UNITED STATES PATENT OFFICE.

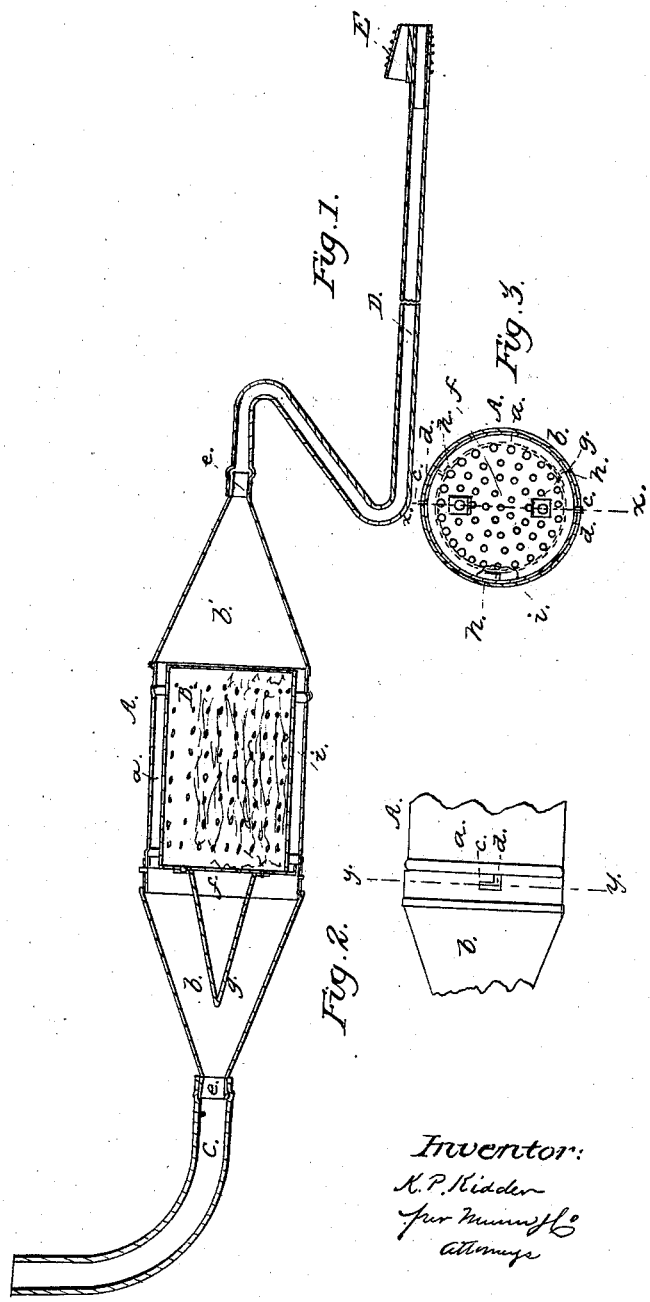

K. P. KIDDER, OF BURLINGTON, VERMONT.

IMPROVED APPARATUS FOR FUMIGATING.

Specification forming part of Letters Patent No. 42,380, dated April 19, 1864.

*To all whom it may concern:*

Be it known that I, K. P. KIDDER, of Burlington, in the county of Chittenden and State of Vermont, have invented a new and useful implement or device, which I term a "fumigator," the same being designed for smoking animals out of their holes and out of hollow trees, and also for stupefying bees in order to take honey from the hives, and arranging or manipulating the parts of the same as may be required without the danger of being stung; and I do hereby declare that the following is a full, clear, and exact description of the same, reference being had to the accompanying drawings, making a part of this specification, in which—

Figure 1 is a longitudinal section of my invention, taken in the line $x$ $x$, Fig. 3; Fig. 2, a side view of a portion of the same; Fig. 3, a transverse section of the same, taken in the line $y$ $y$, Fig. 2.

Similar letters of reference indicate corresponding parts in the several figures.

This invention consists in the employment or use of a case or box formed of two parts and provided with a fire-chamber or perforated plate, as hereinafter fully shown and described, whereby animals may be effectually smoked out of holes or hollow trees and bees stupefied or subdued with the greatest facility.

To enable those skilled in the art to fully understand and construct my invention, I will proceed to describe it.

A represents a case or box, which may be constructed of sheet metal, the central part, $a$, being of cylindrical form, and the ends $b$ $b'$ of conical form. This case or box is composed of two parts, the conical end $b$ being made detached from the other parts of the case, and secured to it by a catch formed by two pins, $c$ $c$, at opposite points at one end of $a$, which fit in right-angular slots $d$ $d$, made in the large end of $b$, the latter fitting over the end of $a$ like a cover on a box. Each end $b$ $b'$ has an opening, $e$, at its apex or tip, and within the cylindrical part $a$ there is placed a cylindrical perforated chamber, B, constructed of sheet metal and having a perforated bottom as well as a perforated cover, $f$, the latter being provided with a handle, $g$. This chamber B is fitted loosely in $a$, and it is provided with longitudinal cleats $h$ at its exterior, which keep the chamber centrally in $a$, and admit of a space, $i$, all around B between it and $a$, as shown in Fig. 1.

C is an elastic tube fitted on the apex or tip of $b$, and D is a similar tube fitted on the apex or tip of $b'$. These tubes may be constructed of india-rubber or other suitable elastic material, and to the end of D there is attached by a wire or cord a short conical tube, E, which may be constructed of sheet metal.

The implement or device is used as follows: The end $b$ is detached from the cylindrical part $a$, the chamber B withdrawn from $a$, and supplied with pieces of decayed wood, punk, or other material, which, when lighted, will emit considerable smoke. The chamber B is then inserted in $a$, the contents of the former being previously lighted, the end $b$ fitted on $a$, and the tube D inserted in the hole as near to the animal as possible, the end of a stick being fitted in the tube E to admit of the tube D being thrust back in the hole, the stick being withdrawn when D is properly adjusted. The tube C is then blown into by the mouth or by means of a bellows, and the smoke from the chamber B injected into the hole.

The fire-chamber B is necessary when an implement or device of considerable size is used for smoking out animals from their holes, for the chamber B protects the case A from the heat from said chamber and prevents the joints or seams from being unsoldered. Smaller devices for smoking bees do not require a fire-chamber, B. A perforated partition-plate fitted and permanently secured in the case, to prevent the fuel being blown through or out of it, is all that is required.

I do no not confine myself to the precise form of the case A herein shown and described, for that may be varied or modified as circumstances may require.

Having thus described my invention, what I claim as new, and desire to secure by Letters Patent, is—

1. A fumigator composed of a box or case provided with a fire chamber or perforated partition, substantially as and for the purpose herein set forth.

2. The elastic tubes C D, in combination with the case A, substantially as and for the purpose specified.

K. P. KIDDER.

Witnesses:
L. M. BRYANT,
A. JOHNSTON.